(12) United States Patent
Suzuki

(10) Patent No.: US 7,049,784 B2
(45) Date of Patent: May 23, 2006

(54) DRIVE VOLTAGE GENERATING APPARATUS AND METHOD FOR CONTROLLING THE SAME

(75) Inventor: Hiroshi Suzuki, Okazaki (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 200 days.

(21) Appl. No.: 10/775,162

(22) Filed: Feb. 11, 2004

(65) Prior Publication Data

US 2004/0207349 A1    Oct. 21, 2004

(30) Foreign Application Priority Data

Feb. 12, 2003 (JP) .............................. 2003-034096

(51) Int. Cl.
*H02P 7/68* (2006.01)
(52) U.S. Cl. .......................................... 318/636; 318/85
(58) Field of Classification Search .................. 318/41, 318/85, 569, 594, 599, 600, 636; 388/901
See application file for complete search history.

(56) References Cited

U.S. PATENT DOCUMENTS

| | | | | |
|---|---|---|---|---|
| 4,200,925 A | * | 4/1980 | Cushman | 700/9 |
| 4,321,516 A | * | 3/1982 | Ohtsuka | 318/571 |
| 4,621,224 A | * | 11/1986 | Watabe et al. | 318/594 |
| 4,772,996 A | | 9/1988 | Hanel et al. | |
| 5,581,452 A | * | 12/1996 | Yamamoto | 363/41 |
| 6,178,103 B1 | * | 1/2001 | Deng et al. | 363/71 |
| 6,912,139 B1 | * | 6/2005 | Kernahan et al. | 363/41 |

FOREIGN PATENT DOCUMENTS

| | | |
|---|---|---|
| EP | 0 268 490 | 5/1988 |
| EP | 1 280 266 | 1/2003 |
| EP | 1 321 838 | 6/2003 |
| JP | 11-299229 | 10/1999 |
| JP | 2002-101647 | 4/2002 |
| JP | 2002-247856 | 8/2002 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

A first drive voltage generating section corresponds to a first motor, and a second drive voltage generating section corresponds to a second motor. Each of the first drive voltage generating section and the second drive voltage generating section includes switching elements, an A/D converter, and an MPU. Each A/D converter samples an analog signal representing a load state of the corresponding motor. A clock circuit synchronizes the control periods of the drive voltage generating sections. Each MPU commands the corresponding A/D converter to sample the analog signal at timing where no switching is performed by any of the switching elements in the drive voltage generating sections. Therefore, the analog signals representing the load states of the motors are preferably sampled without being influenced by noise generated by switching.

12 Claims, 6 Drawing Sheets

DRIVE VOLTAGE GENERATING APPARATUS AND METHOD FOR CONTROLLING THE SAME

CROSS-REFERENCE TO RELATED APPLICATIONS

This application is based upon and claims the benefit of priority from prior Japanese Patent Application No. 2003-034096, filed on Feb. 12, 2003, the entire contents of which are incorporated herein by reference.

BACKGROUND OF THE INVENTION

The present invention relates to a drive voltage generating apparatus, which includes drive voltage generating sections that perform switching of a direct-current voltage and output the voltage to load devices. The present invention also pertains to a method for controlling the apparatus.

Inverter circuits in a motor controlling apparatus and a step-up circuit and a step-down circuit, which are used as power supply, perform switching of a direct-current voltage and output the voltage to load devices. (Hereinafter, step-up circuits and step-down circuits, which function as a power supply, and motor controlling apparatuses are referred to as drive voltage generating apparatuses.)

An inverter circuit in a motor controlling apparatus generates a drive voltage (PWM pulse) by pulse width modulation (PWM) control, and supplies the generated voltage to coils of a motor, thereby driving the motor. For example, an inverter circuit in a motor controlling apparatus for a three-phase direct-current motor has three pairs of switching elements. Each pair of the switching elements corresponds to one of U-phase coil, V-phase coil, and W-phase coil. One of the switching elements in each pair is connected to a positive electrode of a direct-current power supply, and the other switching element in the pair is connected to a negative electrode of the power supply. Each pair of the switching elements supplies drive voltage to the corresponding one of the U-phase coil, the V-phase coil, and the W-phase coil. As the switching elements, power transistors, power field transistors (power FETs), or insulated gate bipolar transistors (IGBT) are used.

A typical motor controlling apparatus samples analog signals representing the values of currents through coils of a motor or analogue signals representing output torque of the motor, thereby converting the signals into digital data. The motor controlling apparatus controls the motor based on the obtained digital data.

In the PWM control, as shown in FIG. 9, a triangular wave WA3 the period of which is predetermined is compared to a comparison signal WB3 that is in inverse proportion to a voltage supplied to the motor. The switching elements are turned on and off at times where the triangular wave WA3 and the comparison signal WB3 intersect each other. Waveforms WUa3 and WUb3 represent ON/OFF states of a pair of switching elements. WUa3 and WUb3 correspond to one phase (U phase) of the inverter circuit. In FIG. 9, WUa3 represents the ON/OFF state of a switching element connected to a positive electrode of a direct-current power supply, and WUb3 represents the ON/OFF state of a switching element connected to a negative electrode of the power supply. When WUa3 is on and WUb3 is off, a U-phase coil of the motor receives the voltage (positive voltage) of the positive terminal of the direct-current power supply. In the reverse state, the U-phase coil receives the voltage (negative voltage) of the negative terminal of the direct current power supply. Therefore, when the comparison signal WB3 is relatively close to a vertex A of a crest of the triangular wave WA3, the positive voltage is outputted only for a short period of time. This lowers the average output voltage in a single control period. On the other hand, when the comparison signal WB3 is in the vicinity of a vertex B of a trough of the triangular wave WA3, the positive voltage is outputted for an extended period of time. This raises the average output voltage in a single control period. In this manner, the ON period and the OFF period of the switching elements in a single control period are controlled. Accordingly, the average output voltage supplied to the motor is varied in a single control period. The PWM pulse is smoothed by the reactance of the coils of the motor. Accordingly, a near-sinusoidal current waveform is formed. That is, by controlling the switching of the switching elements, currents through the coils of the motor are controlled. The torque and the speed of the motor are controlled, accordingly.

A switching element generates electromagnetic waves when performing switching. As a result, switching noise is mixed with signals through analog signal lines. If noise is superimposed on an analog signal representing a current through a coil (for example, a signal WV3 in FIG. 9) and the signal is sampled in this state, the resultant digital data will be erroneous. As a result, accurate control cannot be carried out.

Conventionally, the following measures are taken against the above drawbacks.

(1) The time constant of an analog signal is increased by providing a capacitor in an analog signal line.

(2) Sampling of the analog signal is performed two or more consecutive times. When it is determined that noise has been superimposed on a signal during the sampling, sampling is started over.

(3) Noise-proof lines such as shielded twisted-pair wires are used to transmit analog signals from sensors to an area in the vicinity of an analog-digital converter, thereby preventing noise from being mixed with analog signals.

(4) A value representing an output current of an inverter is differentiated and then multiplied with the impedance. The resultant is used to indirectly detect the load voltage of a load that is driven by the inverter. This method is disclosed in Japanese Laid-Open Patent Publication No. 2002-247856.

Japanese Laid-Open Patent Publications No. 11-299229 and No. 2002-101647 disclose step-up circuits and step-down circuits. These circuits perform switching of a direct-current voltage with switching elements to increase or decrease an input voltage. Therefore, for example, in a case where an input voltage, an output voltage, or a load current is detected and feedback controlled, the above described problems occur. When a step-up circuit or a step-down circuit is used with a motor controlling apparatus, noise due to switching in the step-up circuit or the step-down circuit can be superimposed on analog signals in the motor controlling apparatus.

If the method (1) is applied, the waveform of an analog signal becomes dull. Particularly, when the analog signal changes at a high frequency, accurate information cannot be obtained.

If the method (2) is applied, load on a central processing unit is increased due to the process for multiple sampling and the determination on whether noise is superimposed. Also, since the timing of sampling in a single period varies between a case where noise is superimposed and a case where no noise is superimposed, the accuracy of the control cannot be improved.

If the method (3) is applied, complex wiring must be manually completed during manufacture of the controller. Also, the costs of materials increase the total cost.

If the method (4) is applied by using hardware to perform processes such as differentiation, circuits for differentiation increases the costs. If the differentiation is performed the central processing unit, load on the central processing unit is increased. This can reduce the amount of time that the central control unit spends for controlling. Also, since the computation takes time, the realtimeness of detected values can be spoiled.

SUMMARY OF THE INVENTION

Accordingly, it is an objective of the present invention to provide a drive voltage generating apparatus that eliminates influences from noise caused by switching and permits an analog signal, which represents a load state of a load device, to be preferably sampled. The present invention also pertains to a method for controlling such an apparatus.

To achieve the above objective, the present invention provides a drive voltage generating apparatus. The apparatus has a plurality of drive voltage generating sections. Each drive voltage generating section corresponds to one of a plurality of load devices and outputs a drive voltage to the corresponding load device. Each drive voltage generating section includes a switching element, sampling means and controlling means. The switching element switches a direct current voltage to generate the drive voltage. The sampling means samples an analog signal representing a load state of the corresponding load device. The controlling means causes the sampling means to perform sampling according to a predetermined control period. Based on a result of the sampling, the controlling means controls the switching element. The apparatus further comprises synchronizing means that synchronizes the control periods of all the drive voltage generating sections. Each controlling means commands the corresponding sampling means to sample the analog signal at timing where any of the switching elements in the drive voltage generating sections does not perform switching.

According to another aspect of the invention, a method for controlling a drive voltage generating apparatus is provided. The apparatus has a plurality of drive voltage generating sections. Each drive voltage generating section corresponds to one of a plurality of load devices and outputs a drive voltage to the corresponding load device. Each drive voltage generating section performs steps of switching a direct current voltage to generate the corresponding drive voltage, sampling an analog signal representing a load state of the corresponding load device according to a predetermined control period, and switching the direct current voltage based on a result of the sampling. The method further comprises synchronizing the control periods of all the drive voltage generating sections. The sampling is performed at timing where no switching is performed in any of the drive voltage generating sections.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 through 5.

Figure 1:
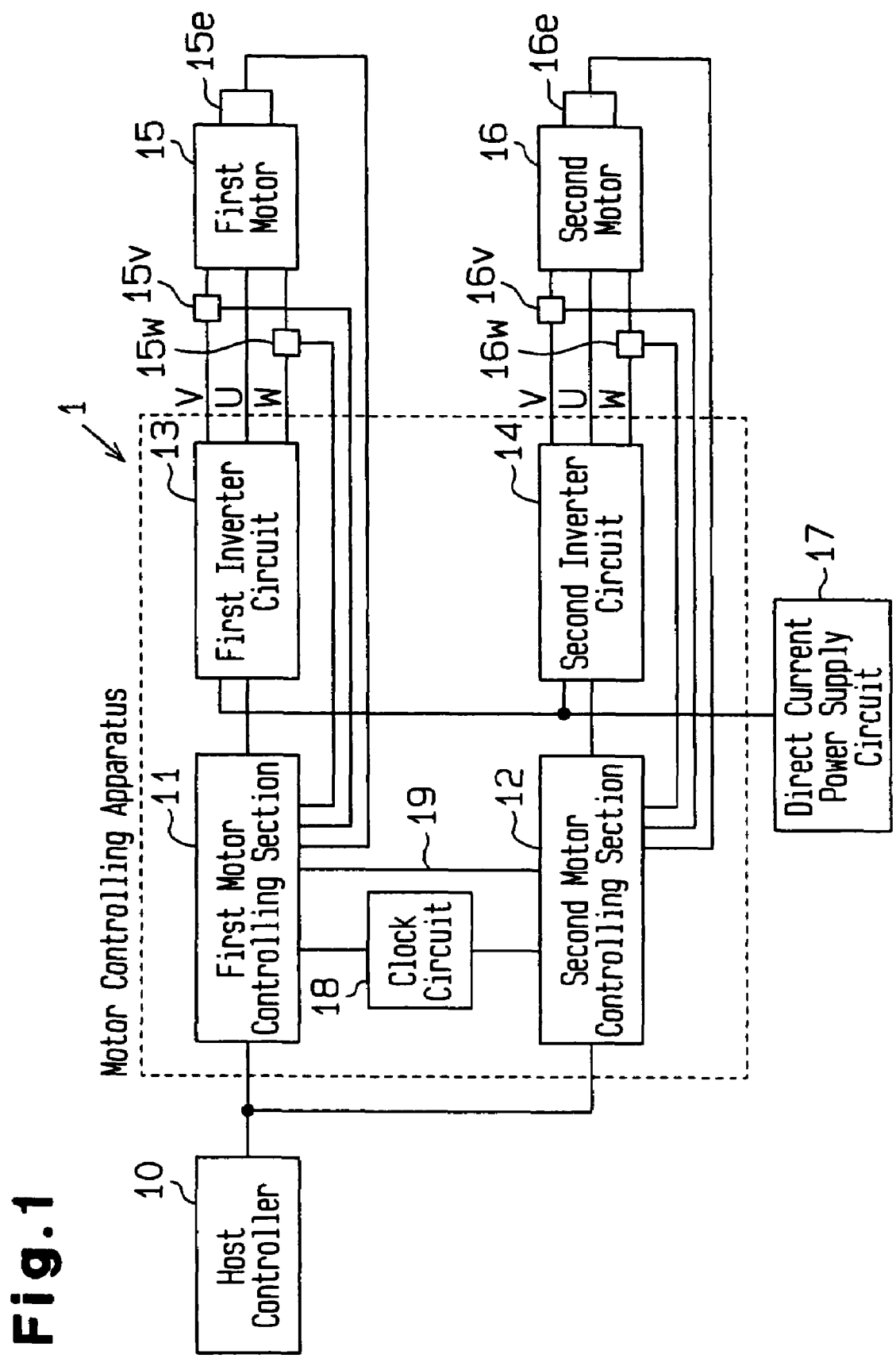
FIG. 1 is a diagrammatic view showing a control system having a motor controlling apparatus according to a first embodiment of the present invention.

As shown in FIG. 1, a host controller 10 sends to a client controller, which is a motor controlling apparatus 1, commands related to rotation speeds of load devices, which are first and second motors 15, 16. The motor controlling apparatus 1, which functions as a drive voltage generating apparatus, generates drive voltage supplied to the motors 15, 16 to control the first and second motors 15, 16 in accordance with speed commands from the host controller 10. Each of the first motor 15 and the second motor 16 is a three-phase brushless DC motor that has a U-phase coil, a V-phase coil, and a W-phase coil. The first motor 15 and the second motor 16 have the same configuration. For example, the first motor 15 is used in an on-vehicle electric power steering (EPS), and the second motor 16 is used in a variable gear ratio steering (VGRS). The configuration of the motor controlling apparatus 1 will now be described.

The motor controlling apparatus 1 has a first drive voltage generating section corresponding to the first motor 15, and a second drive voltage generating section corresponding to the second motor 16. The first drive voltage generating section includes a first motor controlling section 11 and a first inverter circuit 13. The second drive voltage generating section includes a second motor controlling section 12 and a second inverter circuit 14. The first drive voltage generating section and the second drive voltage generating section have the same configuration and operate in the same manner. Accordingly, the following description is mainly directed to the first drive voltage generating section. Regarding the configuration and the operation of the second drive voltage generating section, refer to the description of the first drive voltage generating section.

The host controller 10 outputs to the first motor controlling section 11 a speed command for the first motor 15. In response to the inputted speed command, the first motor controlling section 11 determines a pattern of PWM output for controlling the first motor 15, and outputs information related to the PWM output pattern to the first inverter circuit 13. The first inverter circuit 13 receives a direct current from a direct current voltage source, which is a direct current power supply circuit 17. According to the information regarding the PWM output pattern, the first inverter circuit 13 switches the direct current voltage from the direct current power supply circuit 17, and outputs PWM pulses to the first motor 15.

Current sensors 15v, 15w are provided to correspond to the V-phase coil and the W-phase coil of the first motor 15, respectively. The current sensors 15v, 15w detect current values of the V-phase coil and the W-phase coil of the first motor 15 as analog signals WV1, WW1, respectively. The current sensors 15v, 15w feed back the detected analog signals WV1, WW1 to the first motor controlling section 11. Based on the detected V-phase current value and W-phase current value, the first motor controlling section 11 computes a current value of the U-phase coil of the first motor 15. The computed current value represents the U-phase current value. The first motor 15 has an encoder 15e. The encoder 15e detects an rotation angle of the first motor 15 and feeds back the rotation angle to the first motor controlling section 11.

Current sensors 16v, 16w are provided to correspond to the V-phase coil and the W-phase coil of the second motor 16, respectively. The second motor 16 has an encoder 16e. The current sensors 16v, 16w and the encoder 16e function in the same manner as the current sensors 15v, 15w, and the encoder 15e, which correspond to the first motor 15. The first motor controlling section 11 and the second motor controlling section 12 are connected to each other with a communication line 19. The communication line 19 enables transmission of information between the controlling sections 11, 12.

A clock circuit 18, which functions as synchronizing means, is electrically connected to the first motor controlling section 11 and the second motor controlling section 12. The clock circuit 18 generates a clock signal and sends the generated clock signal to the controlling sections 11, 12.

Figure 2:
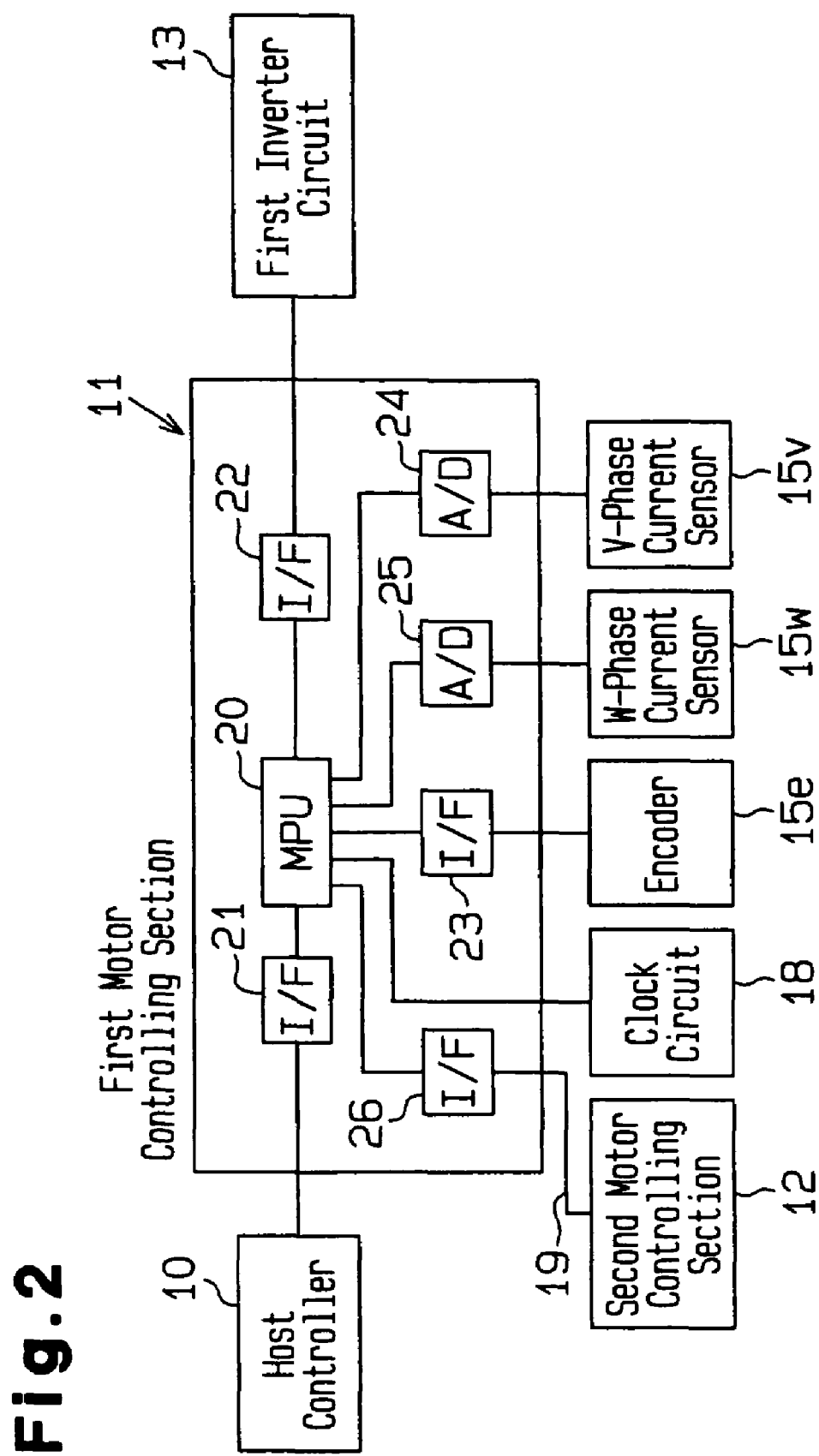
FIG. 2 is a diagrammatic view showing a first motor controlling section according to the first embodiment.

The configuration of the first motor controlling section 11 will now be described. As shown in FIG. 2, the first motor controlling section 11 has an MPU 20 as a main component. The first motor controlling section 11 also includes an interface devices (I/F) 21–23, 26, and A/D converters 24, 25. The I/F 21 enables communication between the MPU 20, which functions as controlling means and a controller, and the host controller 10. The I/F 22 enables MPU 20 to output the PWM output pattern information to the first inverter circuit 13. The I/F 23 enables MPU 20 to input information from the encoder 15e. The A/D converters 24, 25, which function as sampling devices and sampling means, samples analog signals from the corresponding current sensors 15v, 15w and converts the analog signals into digital signals. The A/D converters 24, 25 then send the converted digital signals to the MPU 20. The MPU 20 controls the sampling timing of the A/D converters 24, 25. The I/F 26 enables communication between the first motor controlling section 11 and the second motor controlling section 12 through the communication line 19.

Figure 3:
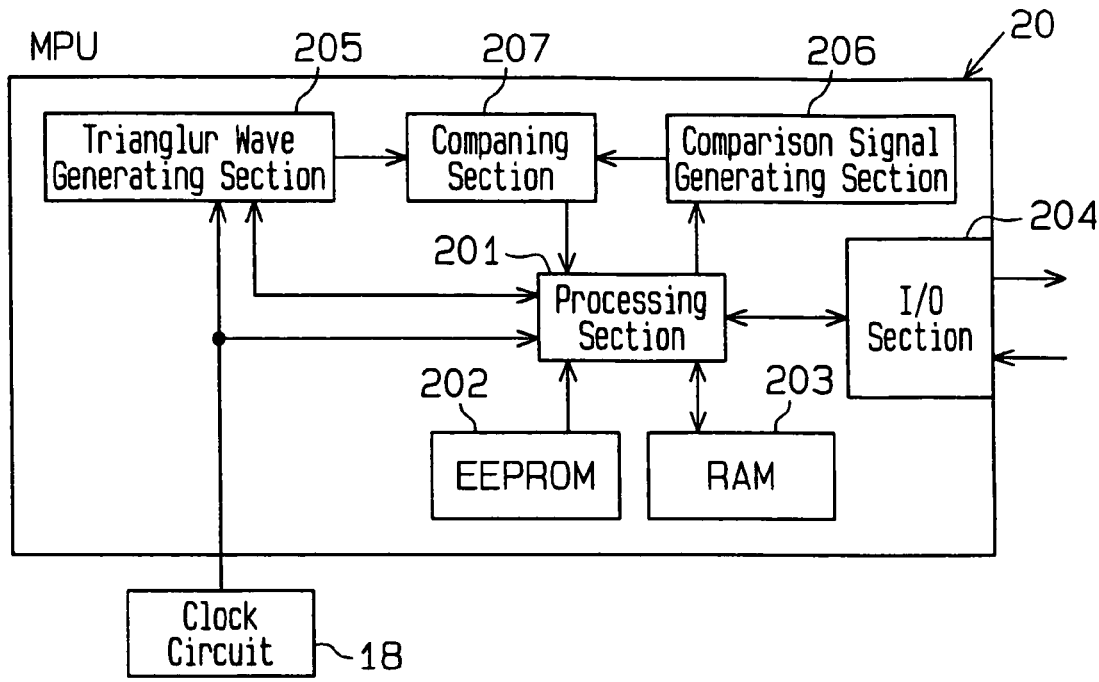
FIG. 3 is a diagrammatic view showing the inner configuration of an MPU according to the first embodiment.

As shown in FIG. 3, the MPU 20 includes a processing section 201, an EEPROM 202, a RAM 203, and an I/O section 204. The EEPROM 202 stores programs executed by the processing section 201. The RAM 203 stores information needed when the processing section 201 performs programs. The I/O section 204 enables transmissions of signals between the processing section 201, and the I/F 21–23, 26 and the A/D converters 24, 25.

The MPU 20 further includes a triangular wave generating section 205, a comparison signal generating section 206, and a comparing section 207. The comparison signal generating section 206 generates a comparison signal that is compared with a triangular signal generated by the triangular wave generating section 205. The comparing section 207 compares the triangular wave with the comparison signal. The clock circuit 18 supplies the clock signal to the processing section 201, thereby defining a period at which the processing section 201 performs programs. The clock circuit 18 also supplies the clock signal to the triangular wave generating section 205.

The configuration and the functions of the second motor controlling section 12 are similar to those of the first motor controlling section 11. Accordingly, the reference numerals of the first motor controlling section 11 shown in FIGS. 2 and 3 are hereinafter employed when describing the components of the second motor controlling section 12.

Figure 4:
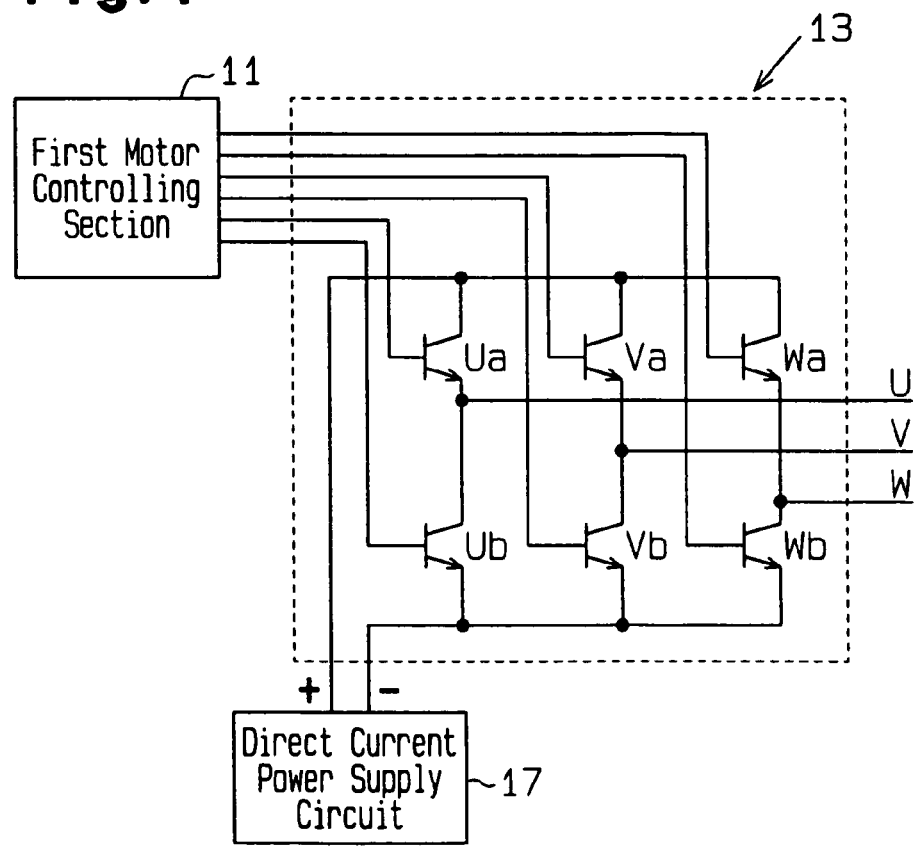
FIG. 4 is a diagrammatic view showing a first inverter circuit according to the first embodiment.

As shown in FIG. 4, the first inverter circuit 13 includes a pair of switching elements Ua, Ub that correspond to the U-phase coil, a pair of switching elements Va, Vb that correspond to the V-phase coil, and a pair of switching elements Wa, Wb that correspond to the W-phase coil. Each of the switching elements Ua–Wb, which function as switching devices constituted by power transistors, is turned on and off according to the PWM output pattern information sent from the first motor controlling section 11.

The direct current power supply circuit 17 has a positive electrode (+) and a negative electrode (−). The switching elements Ua, Va, Wa are connected to the positive electrode of the power supply circuit 17. The switching elements Ub, Vb, Wb are connected to the negative electrode of the power supply circuit 17. Each of the switching elements Ua, Va, Wa connected to the positive electrode is connected to the corresponding one of the switching elements Ub, Vb, Wb connected to the negative electrode. From the connection of each pair of the switching elements Ua–Wb of the same phase, a PWM pulse is outputted to the coil of the corresponding phase. For example, when the switching element Ua connected to the positive electrode is on and the switching element Ub connected to the negative electrode is off, a positive voltage is supplied to the U-phase coil of the first motor 15 from the power supply circuit 17. Contrastively, when the switching element Ua connected to the positive electrode is off and the switching element Ub connected to the negative electrode is on, a negative voltage (reference voltage) is supplied to the U-phase coil of the first motor 15 from the power supply circuit 17.

The configuration and the functions of the second inverter circuit 14 are similar to those of the first inverter circuit 13. Accordingly, the reference numerals of the components of the first inverter circuit 13 shown in FIG. 4 are employed when describing the components of the second inverter circuit 14.

Each of the switching elements Ua–Wb of the motor controlling sections 11, 12 performs switching in a significantly short period (for example. 0.1 μsecond). During switching, a current to the corresponding coil of the motors 15, 16 is instantaneously stopped. This creates an electromagnetic wave and thus may create noise in signal lines of surrounding circuits. In digital lines, noise does not cause any problems as long as the magnitude of the noise is less than threshold values of the on and off states of digital signals. However, in analog signal lines, that is, in signal lines from the current sensors 15v, 15w (16v, 16w) to the A/D converters 24, 25, noise causes problems. Specifically, if any of the A/D converters 24, 25 samples an analog signal from the corresponding one of the sensors 15v–16w at the same as noise is mixed in the analog signal, the accuracy of the value obtained through sampling is directly influenced.

The objective of the present embodiment is to solve such problems. Hereinafter, the operation of the motor controlling apparatus 1 will be discussed.

In the first motor controlling section 11, the processing section 201 determines current values to be supplied to the coils of the U, V, and W phases based on the speed command from the host controller 10, the rotation angle of the first motor 15 obtained from the encoder 15e, and the rotation speed, which is obtained by differentiating the rotation angle. The processing section 201 compares the computed current values with the actual current values (detected current values) obtained from the current sensors 15v, 15w and determines voltage values to be applied to the coils of the U, V, and W phases. According to the computed voltage values, the processing section 201 sends commands to the comparison signal generating section 206 thereby causing the comparison signal generating section 206 to a comparison signal having a voltage level that corresponds to the voltage value to be applied to the coils of the U, V, and W phases. The processing section 201 sends commands to the comparison signal generating section 206 at every predetermined control period (for example, 1 ms). The processing section 201, for example, counts clocks in a clock signal from the clock circuit 18. When the count value reaches a predetermined value, the processing section 201 performs an interruption to control the control period.

In the first motor controlling section 11, the triangular wave generating section 205 generates a triangular wave signal WA1 (see FIG. 5) having the control period in response to commands form the processing section 201. The period of the triangular wave signal WA1 is maintained to a constant value by the clock signal. The comparing section 207 compares the triangular wave signal WA1, which is a signal from the triangular wave generating section 205, with the output signal WB1 of the comparison signal generating section 206. When the order of magnitude of the triangular wave signal WA1 and the output signal WB1 is reversed, the comparing section 207 outputs an interruption signal to the processing section 201. Upon receiving the interruption signal, the processing section 201 renews the PWM output pattern information, and outputs the renewed PWM output pattern information to the first inverter circuit 13 through the I/O section 204 and the I/F 22.

Figure 5:
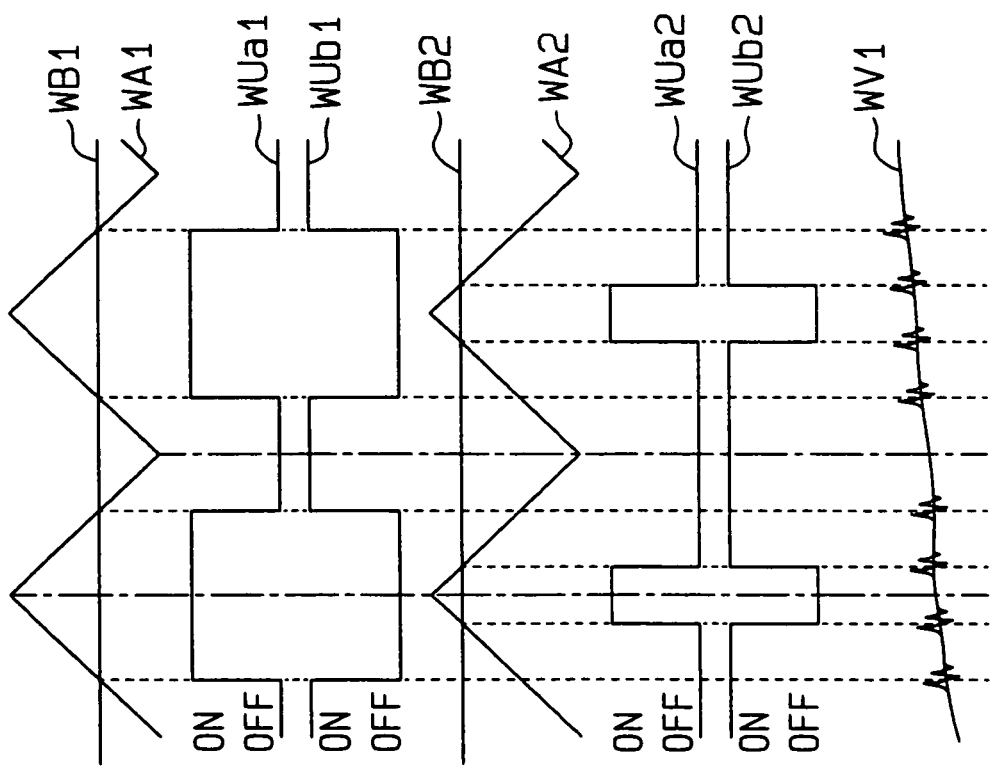
FIG. 5 is a time chart showing waveforms of a triangular wave generating section according to the first embodiment, waveforms of a comparison signal generating section, and the ON/OFF state of switching elements.

Output signals from the switching elements Ua, Ub of the first inverter circuit 13 are represented by WUa1, WUb1 (see FIG. 5). When the triangular wave signal WA1 crosses the comparison signal WB1 while ascending, the switching element Ua is turned on, and the switching element Ub is turned off in the first inverter circuit 13. When the triangular wave signal WA1 crosses the comparison signal WB1 while descending, the switching element Ua is turned off, and the switching element Ub is turned on. While the triangular wave signal WA1 is above the comparison signal WB1, the switching element Ua is on and the switching element Ub is off. In this state, the positive voltage is supplied to the first motor 15 from the direct current power supply circuit 17 through the switching element Ua. Since the coils of the U, V, and W phases each have a great reactance component, the current through the corresponding wire is a sinusoidal wave containing a harmonics. Therefore, even if the voltage supplied to the first motor 15 is discretely changed, the first motor 15 smoothly rotates.

The second motor controlling section 12 operates in the same manner as the first motor controlling section 11 to drive the second motor 16. FIG. 5 shows an output signal WA2 of the triangular wave generating section 205 of the second motor controlling section 12, an output signal WB2 of the comparison signal generating section 206, and output signals WUa2, WUb2 of the switching elements Ua, Ub of the second inverter circuit 14. FIG. 5 also shows an analog output signal WV1 of the current sensor 15v, which corresponds to the V-phase coil of the first motor 15. Noise due to switching of the switching elements Ua–Wb in the inverter circuits 13, 14 is superimposed on the analog output signal WV1.

One of the characteristics of this embodiment is that the triangular wave signal WA1 of the first motor controlling section 11 and the triangular wave signal WA2 of the second motor controlling section 12 are in synchronization with each other. Also, the analog output signals WV1, WW1, WV2, WW2 of the current sensors 15v, 15w, 16v, 16w are sampled at vertexes of crests or troughs of the triangular wave signals WA1, WA2. Although the analog output signals WW1, WV2, WW2 of the sensors 15w, 16v, 16w are not shown in FIG. 5, the signals WW1, WV2, WW2 are sampled at the same timing as the analog output signal WV1.

A procedure for bringing the triangular wave signal WA1 and the triangular wave signal WA2 into synchronization with each other will now be described. When the motor controlling apparatus 1 is turned on, the first motor controlling section 11 and the second motor controlling section 12 each perform initialization. When a predetermined period has elapsed after the initialization, the first motor controlling section 11 sends a signal for starting generation of triangular wave to the second motor controlling section 12 through the communication line 19. In response to the triangular wave generation starting signal, the processing sections 201 of the first motor controlling section 11 and the second motor controlling section 12 cause the triangular wave generating sections 205 to simultaneously generate the triangular wave signals WA1, WA2. After starting generation of the triangular wave signals WA1, WA2, the triangular wave generating sections 205 generate the triangular wave signals WA1, WA2 based on the common clock signal from the clock circuit 18. Thus, there is no phase difference between the triangular wave signals WA1, WA2. That is, the triangular wave signals WA1, WA2 are maintained in synchronization.

Each triangular wave generating section 205 outputs an interruption signal to the processing section 201 at vertexes of crest or a vertexes of trough of the corresponding one of the triangular wave signals WA1, WA2. Based on the interruption signal, each processing section 201 causes the A/D converters 24, 25 to sample the analog output signals WV1–WW2 from the corresponding sensors 15v–16w at the timing of vertexes of the triangular wave signals WA1, WA2.

In this manner, the triangular wave signals WA1, WA2 of the first motor controlling section 11 and the second motor controlling section 12 are brought into synchronization. At every vertex of the crest or trough of the triangular wave signals WA1, WA2, the A/D converters 24, 25 sample the signals from the corresponding current sensors 15v–16w. As described above, in areas near vertexes of the triangular wave signals WA1, WA2, the switching elements Ua–Wb of the inverter circuits 13, 14 do not perform switching. Therefore, the A/D converters 24, 25 are capable of performing sampling without switching noise if the A/D converters 24, 25 sample the analog output signals WV1–WW2 from the current sensors 15v–16w at the timing of the vertexes.

When load on the motors 15, 16 is in a certain state, that is, when the load on the motors 15, 16 is significantly close to either the maximum value or the minimum value in a permissible range of load, the voltage levels of the comparison signals WB1, WB2 can significantly close to the voltage levels of the corresponding triangular wave signals WA1, WA2 at vertexes. In other words, the switching timing of the switching elements Ua–Wb of the motor controlling sections 11, 12 can be close to the timing at which the A/D converters 24, 25 of the motor controlling sections 11, 12 sample the analog output signals WV1–WW2. In this case, the range of the voltage levels of the comparison signals WB1, WB2 is narrowed to be less than the amplitude of the corresponding triangular wave signals WA1, WA2. Alternatively, the switching timing of the switching elements Ua–Wb of the motor controlling section 11, 12 are limited by the MPU 20.

The motor controlling apparatus 1 according to this embodiment provides the following advantages.

(1) Each of the first motor controlling section 11 and the second motor controlling section 12 samples the analog output signals WV1–WW2, which represent the load state of the corresponding motors 15, 16, at the timing in which the switching elements Ua–Wb of the motor controlling sections 11, 12 do not perform switching. Thus, without being influenced by the noise generated by switching, the analog output signals WV1–WW2 are accurately sampled.

This advantage, or suppression of influence of noise, is particularly effective in this embodiment, which has drive voltage generating sections that perform switching, or the motor controlling sections 11, 12.

Figure 9:
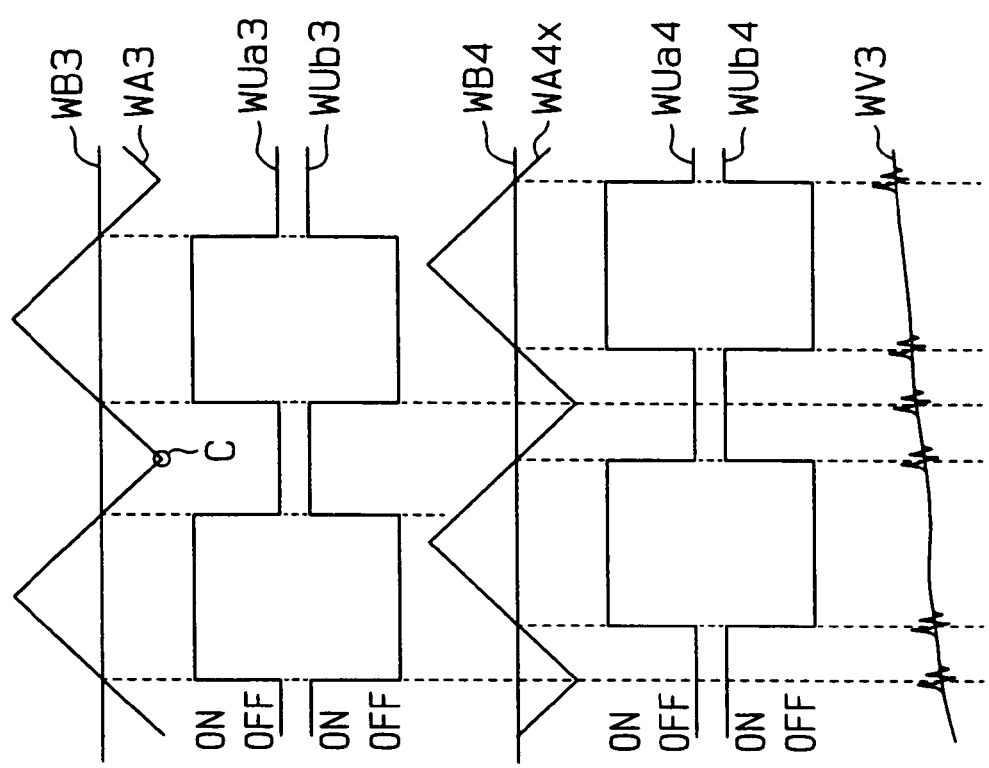
FIG. 9 is a time chart showing waveforms of a prior art triangular generating section, waveforms of a comparison signal generating section, and the ON/OFF state of switching elements.

FIG. 9 shows comparison examples, or a triangular wave signal WA3 in the first motor controlling section 11 and a triangular wave signal WA4 in the second motor controlling section 12. The period of the triangular wave signal WA3 is different from the period of the triangular wave signal WA4. The timing of vertexes of the triangular wave signal WA3 is asynchronous to that of the triangular wave signal WA4. The A/D converter 24 of the first motor controlling section 11 samples an analog signal WV3 at vertexes of the triangular wave WA3. Accordingly, the sampling timing at the first motor controlling section 11 is different from the switching timing at the first motor controlling section 11. That is, the A/D converter 24 of the first motor controlling section 11 is capable of sampling the analog signal WV3 without being influenced by the noise generated by switching of the switching elements Ua–Wb of the first motor controlling section 11.

However, at a vertex A of the triangular wave signal WA3 in FIG. 9, the sampling timing of the A/D converter 24 of the first motor controlling section 11 coincides with the switching timing of the switching elements Ua, Ub of the second motor controlling section 12. That is, timing at which ON/OFF states of output signals WUa4 (corresponding to a positive electrode) and WUb4 (corresponding to a negative electrode) of the switching elements Ua, Ub of the second motor controlling section 12 is switched coincides with the sampling timing of the analog signal WV3 of the first motor 15. This causes noise from the second motor controlling section 12 to be superimposed on the analog signal WV3 of the sampling.

Figure 10:
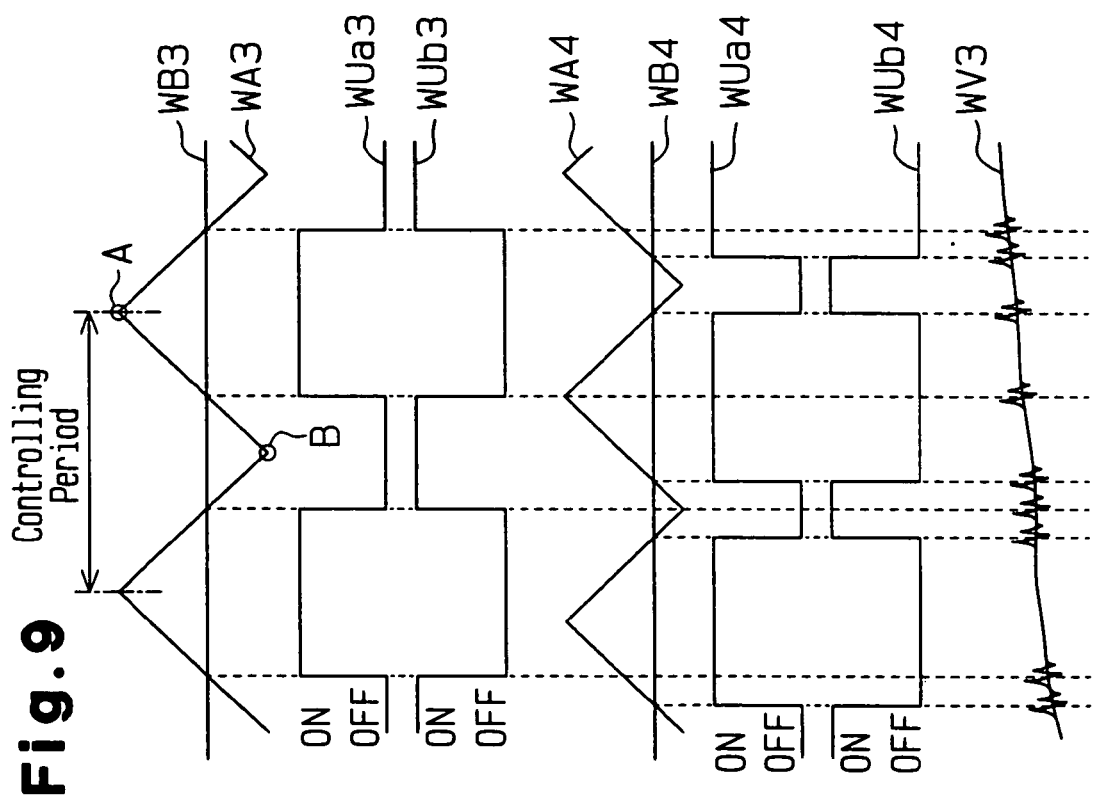
FIG. 10 is a time chart showing waveforms of a prior art triangular generating section, waveforms of a comparison signal generating section, and the ON/OFF state of switching elements.

FIG. 10 shows another comparison examples, or a triangular wave signal WA4x of the second motor controlling section 12, and a triangular wave signal WA3 of the first motor controlling section 11. The period of the triangular wave signal WA4x is the same as the period of the triangular wave signal WA3. The phases of the triangular wave signals WA4x and WA3 are deviated from each other. In this case, noise from the second motor controlling section 12 is superimposed on the analog signal WV3 at the sampling timing at a vertex C in FIG. 10.

Further, noise at the first motor controlling section 11 can be superimposed on an analog signal at the sampling timing of the second motor controlling section 12.

Particularly, due to demands for lighter and more compact devices, the packaging density of circuit elements in recent controllers have been increased. Thus, electromagnetic waves generated by one of the motor controlling sections 11, 12 are likely to influence the other one of the motor controlling sections 11, 12. Further, in this embodiment, the motor controlling apparatus 1 is formed by integrating a plurality of drive voltage generating sections, or the motor controlling sections 11, 12. Thus, electromagnetic waves generated by one of the motor controlling sections 11, 12 are very likely to influence the other one of the motor controlling sections 11, 12. It is therefore further important to take measures against the noise between the motor controlling sections 11, 12. The motor controlling apparatus 1 of this embodiment eliminates the above drawbacks. That is, in a state where the motor controlling apparatus 1 has a plurality of drive voltage generating sections, or the motor controlling sections 11, 12 that perform switching, the motor controlling apparatus 1 eliminates influence of noise generated by switching and accurately samples the analog signals WV1–WW2, which represent the load state of the motors 15, 16.

(2) The first motor controlling section 11 and the second motor controlling section 12 operate based on the common clock signal. Thus, processes of the motor controlling sections 11, 12 are accurately brought into synchronization. When the motor controlling apparatus 1 is operated for an extended period of time, the first motor controlling section 11 and the second motor controlling sections 12 are prevented from being out of synchronization. That is, even if the motor controlling apparatus 1 is operated for an extended period of time, this embodiment prevents noise generated by switching at one of the controlling sections 11, 12 from adversely affecting the sampling of the analog output signals WV1–WW2 by the other one of the controlling sections 11, 12.

(3) The triangular wave signals WA1, WA2 of the controlling sections 11, 12 have the same period and are in synchronization. The analog signals WV1–WW2 are sampled at vertexes of the triangular wave signals WA1, WA2. Therefore, the timing of switching at the motor controlling sections 11, 12 and the timing of sampling at the motor controlling sections 11, 12 are reliably deviated from each other. That is, when noise due to switching of the switching elements Ua–Wb of the motor controlling sections 11, 12 is superimposed on the analog signals WV1–WW2, the analog signals WV1–WW2 are reliably prevented from being sampled by the A/D converters 24, 25. Since the sampling timing is fixed in a predetermined range of period, the motor controlling sections 11, 12 accurately detect changes in the analog output signals WV1–WW2.

A second embodiment of the present invention will now be described with reference to FIGS. 7 and 8.

Figure 7:
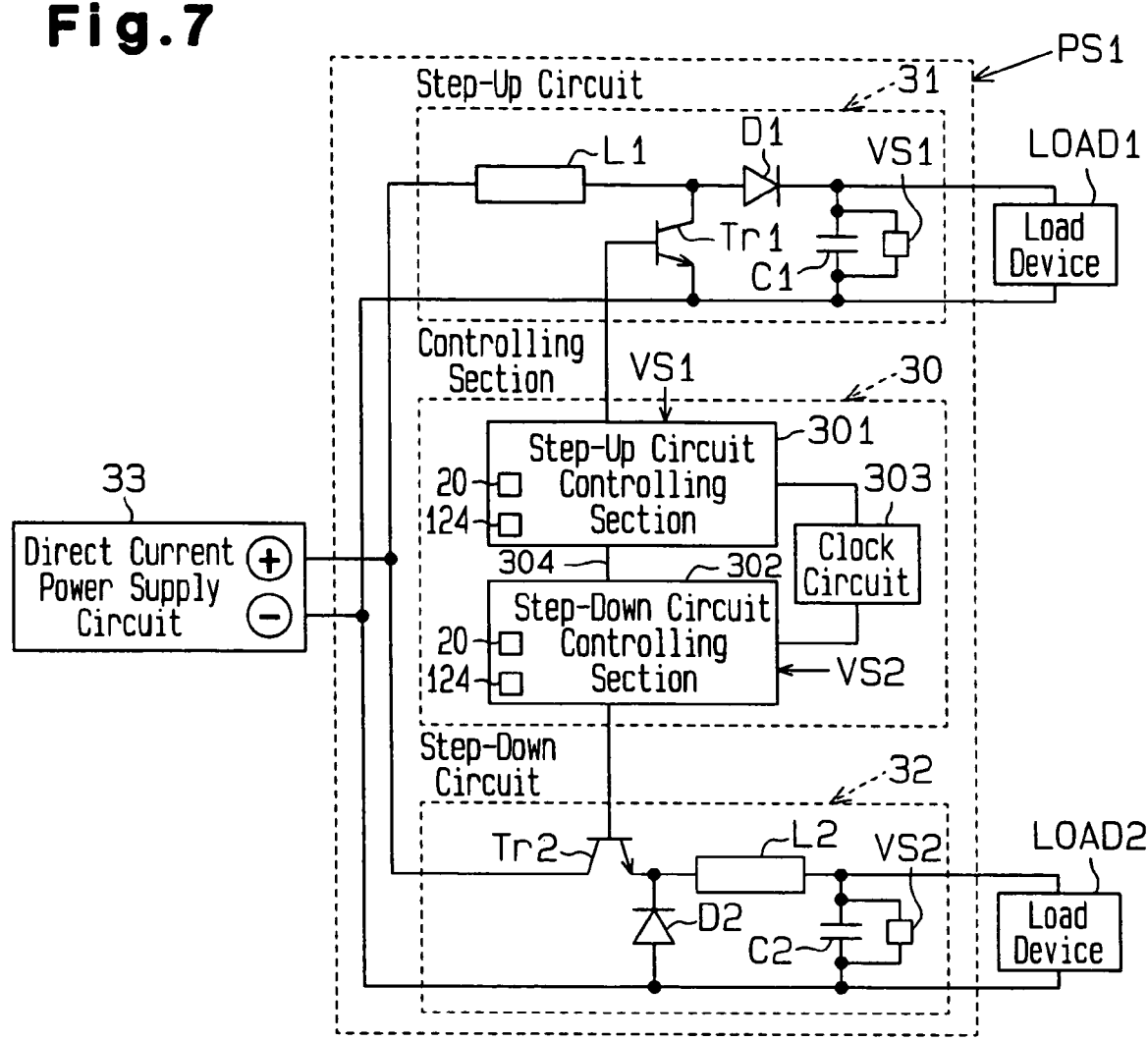
FIG. 7 is a diagrammatic view showing a transformer PS1 and a load devices LOAD1, LOAD2 according to a second embodiment.
Figure 8:
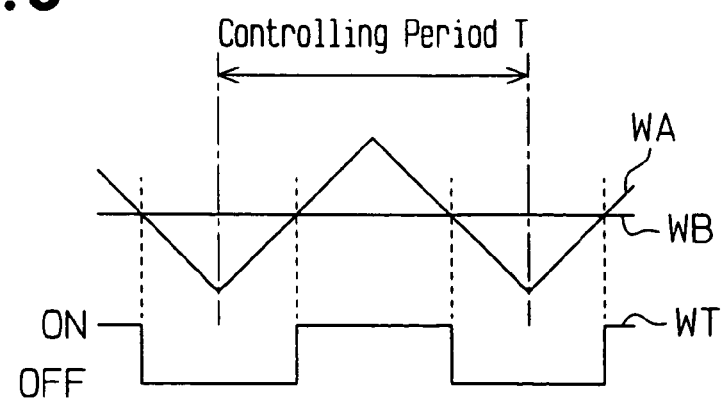
FIG. 8 is a time chart showing the relationship between a triangular wave WA, a comparison signal WB, an ON/OFF waveform WT of transistors Tr1, Tr2 according to the second embodiment.

As shown in FIG. 7, a transformer PS1, which functions as a drive voltage generating apparatus, includes a controlling section 30, a step-up circuit 31, and a step-down circuit 32. The controlling section 30 includes a step-up circuit controlling section 301, a step-down circuit controlling section 302, and a clock circuit 303. The step-up circuit 31 and the step-up circuit controlling section 301 form a first drive voltage generating section that corresponds to a load device LOAD1. The step-down circuit 32 and the step-down circuit controlling section 302 form a second drive voltage generating section that corresponds to a load device LOAD2.

The step-up circuit 31 increases a direct current voltage and outputs the voltage to the load device LOAD1. The step-down circuit 32 decreases a direct current voltage and outputs the voltage to the load device LOAD2. The controlling section 30 controls the step-up circuit 31 and the step-down circuit 32. The step-up circuit 31 and the step-down circuit 32 receive direct current voltage from a direct current power supply circuit 33, which functions as a direct current voltage source.

The step-up circuit 31 includes a coil L1, a diode D1, a transistor Tr1, and a capacitor C1. The coil L1 has two ends. One of the ends is connected to a positive electrode (+) of the direct current power supply circuit 33, and the other end is connected to an anode of the diode D1. The transistor Tr1, which corresponds to a switching element, has a collector connected to a connection between the coil L1 and the diode D1, and an emitter connected to a negative electrode (−) of the direct current power supply circuit 33. The capacitor C1 has two ends. One of the ends is connected to a cathode of the diode D1, and the other end is connected to the negative electrode (−) of the direct current power supply circuit 33. Between the ends of the capacitor C1, a drive voltage to be supplied to the load device LOAD1 is generated. A voltage sensor VS1 is provided in parallel with the capacitor C1. The voltage sensor VS1 detects the drive voltage supplied to the load device LOAD1.

The step-down circuit 32 includes a transistor Tr2, a diode D2, a coil L2, and a capacitor C2. A collector of the transistor Tr2, which functions as a switching element, is connected to the positive electrode of the direct current power supply circuit 33. The diode D2 includes a cathode connected to an emitter of the transistor Tr2 and an anode connected to the negative electrode of the direct current power supply circuit 33. The coil L2 has two ends. One of the ends is connected to the emitter of the transistor Tr2. The other end of the coil L2 is connected to one of two ends of the capacitor C2. The other end of the capacitor C2 is connected to the negative electrode of the direct current power supply circuit 33. Between the ends of the capacitor C2, a drive voltage to be supplied to the load device LOAD2 is generated. A voltage sensor VS2 is provided in parallel with the capacitor C2. The voltage sensor VS2 detects the drive voltage supplied to the load device LOAD2.

The step-up circuit controlling section 301, which functions as controlling means, turns on and off the transistor Tr1 of the step-up circuit 31. The step-down circuit controlling section 302, which functions as controlling means, controls turning on and off of the transistor Tr2 of the step-down circuit 32. The clock circuit 303, which functions as synchronizing means, generates a clock signal at a predetermined period, and supplies the generated clock signal to the step-up circuit controlling section 301 and the step-down circuit controlling section 302. The step-up circuit controlling section 301 and the step-down circuit controlling section 302 each have an MPU 20 that is similar to the MPU 20 used in the motor controlling sections 11, 12 of the first embodiment. Regarding the configuration of the MPU 20, refer to FIG. 3. The clock circuit 303 supplies the clock signal to the controlling sections 301, 302, and the MPU 20. A communication line 304 enables transmission of information between the step-up circuit controlling section 301 and the step-down circuit controlling section 302.

An A/D converter 124 of the step-up circuit controlling section 301 converts an analog signal from the voltage sensor VS1 and outputs the converted signal to the MPU 20 of the step-up circuit controlling section 301. An A/D converter 124 of the step-down circuit controlling section 302 converts an analog signal from the voltage sensor VS2 and outputs the converted signal to the MPU 20 of the step-down circuit controlling section 302.

In each of the step-up circuit controlling section 301 and the step-down circuit controlling section 302, the transistors Tr1, Tr2 are turned on and off when the triangular wave signal WA from the triangular wave generating section 205 crosses the comparison signal WB from the comparison signal generating section 206 (refer to the output signal WT from the transistors Tr1, Tr2). The A/D converter 124 samples a signal from the voltage sensors VS1, VS2 at every control period T of the triangular wave signal WA.

In a single control period T, a period where the transistor Tr1 is on is referred to as ton1, a voltage generated by the direct current power supply circuit 33 is referred to as Vin, and a drive voltage supplied from the step-up circuit 31 to the load device LOAD1 is referred to as Vout1. In an ideal model in which the inductance of the coil L1 and the capacitance of the capacitor C1 are sufficiently great and there is no voltage drop in the diode D1, the equation Vout1=T/(T−ton1)×Vin is satisfied.

That is, the drive voltage Vout1 is varied according to the ON period ton1 of the transistor Tr1. The length of the ON period ton1 varies according to the comparison signal WB. Therefore, the drive voltage Vout1 can be controlled by controlling the voltage level of the comparison signal WB. The voltage level of the comparison signal WB is controlled according to the deviation between a predetermined target value of the drive voltage Vout1 and the actual value of the drive voltage Vout1 detected by the voltage sensor VS1. The comparison signal generating section 206 of the step-up circuit controlling section 301 controls the voltage level of the comparison signal WB such that the drive voltage Vout1 is held at the target value even if the current consumption of the load device LOAD1 is changed or the voltage generated by the direct current power supply circuit 33 is changed.

In a single control period T, a period where the transistor Tr2 is on is referred to as ton2, and a drive voltage supplied from the step-down circuit controlling section 302 to the load device LOAD2 is referred to as Vout2. In an ideal model in which the inductance of the coil L2 and the capacitance of the capacitor C2 are sufficiently great and there is no voltage drop in the diode D2, the equation Vout2=ton2/T×Vin is satisfied.

That is, the drive voltage Vout2 is varied according to the ON period ton2 of the transistor Tr2. The length of the ON period ton2 varies according to the voltage level of the comparison signal WB. Therefore, the drive voltage Vout2 can be controlled by controlling the voltage level of the comparison signal WB. The voltage level of the comparison signal WB is controlled according to the deviation between a predetermined target value of the drive voltage Vout2 and the actual value of the drive voltage Vout2 detected by the voltage sensor VS2. The comparison signal generating section 206 of the step-down circuit controlling section 302 controls the voltage level of the comparison signal WB such that the drive voltage Vout2 is held at the target value even if the current consumption of the load device LOAD2 is changed or the voltage generated by the direct current power supply circuit 33 is changed.

When timing at which the A/D converter 124 samples analog signals (not shown) from the voltage sensors VS1, VS2 and timing at which the transistors Tr1, Tr2 performs switching coincide, noise due to switching is superimposed on the analog signals. The control therefore cannot be accurately performed. Therefore, the sampling timing of the analog signals and the switching timing of the transistors Tr1, Tr2 are controlled to be deviated from each other by a controlling method similar to that in the first embodiment. That is, the step-up circuit controlling section 301 and the step-down circuit controlling section 302 are controlled to generate triangular wave signals WA in synchronization, and the A/D converters 124 are controlled to sample analog signals at vertexes of crest or troughs of the triangular wave signals WA. To implement the method, the clock circuit 303 supplies a common clock signal to the triangular wave generating sections 205 in the controlling sections 301, 302. When a predetermined period has elapsed after initialization of the controlling sections 301, 302, the step-up circuit controlling section 301 sends a signal to initiate generation of a triangular wave to the step-down circuit controlling section 302 through the communication line 304. In response to the initiation signal, the processing sections 201 of the controlling sections 301, 302 causes the triangular wave generating sections 205 to simultaneously start generating the triangular wave signals WA. Accordingly, the second embodiment has the same advantages as the advantages (1) to (3) of the first embodiment.

The present invention may be embodied in the following forms.

In the second embodiment, the target value of the drive voltage is fixed. However, a controlling apparatus for setting the target value may be provided to change the target value whenever necessary.

The motor controlling sections 11, 12 of the first embodiment may be combined with the step-up circuit 31 and the step-up circuit controlling section 301, or with the step-down circuit 32 and the step-down circuit controlling section 302 of the second embodiment, thereby supplying an increased or decreased voltage to the motor controlling sections 11, 12. In this case, for example, noise generated by switching of the step-up circuit 31 or the step-down circuit 32 is prevented from adversely affecting the sampling of the analog signals WV1–WW2 in the controlling sections 11, 12.

Figure 6:
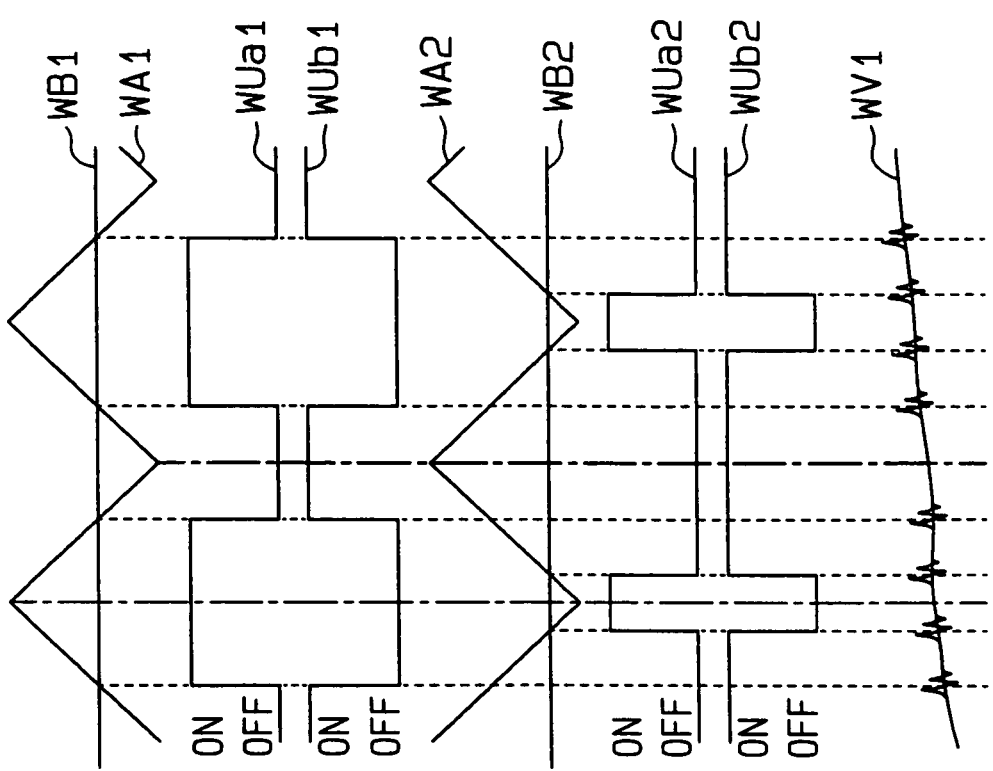
FIG. 6 is a time chart showing waveforms of triangular wave generating sections of a modification of the first embodiment.

As shown in FIG. 6, the phase difference between the triangular wave signal WA1 of the first motor controlling section 11 and the triangular wave signal WA2 of the second motor controlling section 12 may be 180°. That is, the vertexes of crests of the triangular wave signal WA1 may be matched with the vertexes of the troughs of the triangular wave signal WA2, and the vertexes of the troughs of the triangular wave signal WA1 may be matched with the vertexes of the crests of the triangular wave signal WA2. In this case, the timing of vertexes of one of the triangular wave signals WA1, WA2 coincides with the timing of vertexes of the other one of the triangular wave signals WA1, WA2. Therefore, this modification has the advantages similar to the above described advantages (1) to (3).

In the first embodiment, analog signals other than the analog signals WV1–WW2 from the current sensors 15v–16w may be sampled at the vertexes of the triangular wave signals WA1, WA2. For example, an analog signal representing the torque of the vehicle steering, which is required for VGRS, may be sampled at the vertexes of the triangular wave signals WA1, WA2.

In the second embodiment, analog signals other than the analog signals from the voltage sensors VS1, VS2, which detect the drive voltage supplied to the load devices LOAD1, LOAD2, may be sampled at the vertexes of the triangular wave signals WA. For example, a voltage sensor for detecting a voltage generated by the direct current power supply circuit 33 may be provided, and an analog signal from the voltage sensor may be sampled. A current sensor for detecting currents supplied to the load devices LOAD1, LOAD2 may be provided, and an analog signal from the current sensor may be sampled.

In the first embodiment, the starting time of the triangular wave signals WA1, WA2 are brought into synchronization by sending the initiation signal from the first motor controlling section 11 to the second motor controlling section 12. Instead of this configuration, an interruption signal generating circuit may be provided to generate an interruption signal when a predetermined period has elapsed after the motor controlling apparatus 1 is turned on. In this case, the interruption signal generation circuit outputs interruption signals to the first motor controlling section 11 and the second motor controlling section 12 such that the starting time of generation of the triangular wave signals WA1, WA2 are synchronized. A similar interruption signal generating circuit may be applied to the second embodiment.

In the first embodiment, the common clock signal is sent to the processing section 201 and the triangular wave generating section 205, thereby synchronizing the triangular wave signals WA1, WA2. However, different clock signals may be supplied to the processing section 201 and the triangular wave generating section 205. For example, an interruption signal generating circuit may be provided separately from the clock circuit 18, and the triangular wave signals WA1, WA2 may be synchronized by the signal from the interruption signal generating circuit. Even in this case, as long as the periods of the triangular wave signals WA1, WA2 are the same, and the triangular wave signals WA1, WA2 are synchronized, the above described advantages (1) to (3) are provided. In the second embodiment, an interruption signal generating circuit that is different from the clock circuit 303 may be provided.

In the first embodiment, the first motor controlling section 11 and the second motor controlling section 12 may be share a single triangular wave generating section 205, and the triangular wave signal WA form the shared triangular wave generating section 205 and the comparison signals WB1, WB2 of the motor controlling sections 11, 12 may be compared to cause the switching elements Ua–Wb to perform switching. In this case, since only one triangular wave generating section 205 is provided, the cost is reduced. In the second embodiment, the controlling sections 301, 302 may share a single triangular wave generating section 205.

In the first embodiment, to control the switching timing of the switching elements Ua–Wb, the triangular wave signals WA1, WA2 need not be employed. If the control periods of the motor controlling sections 11, 12 are synchronized, the A/D converters 24, 25 sample the analog signals WV1–WW2 at timing where no switching of the switching elements Ua–Wb is being carried out (for example, at a predetermined starting point, a termination point, or an intermediate point in the control period). This prevents noise generated by switching of the switching elements Ua–Wb from adversely affecting values obtained through sampling.

The same advantages are provided when this modification is applied to the second embodiment.

In the first embodiment, the sampling of the analog signals WV1–WW2 is carried out only at the vertexes of crests or the vertexes of the troughs of the triangular wave signals WA1, WA2. That is, the period between consecutive sampling is the control period T. However, the analog signals WV1–WW2 may be sampled both at the vertexes of crests and troughs of the triangular wave signals WA1, WA2. That is, the period of sampling of the analog signals WV1–WW2 may be half the control period T.

Therefore, the present examples and embodiments are to be considered as illustrative and not restrictive and the invention is not to be limited to the details given herein, but may be modified within the scope and equivalence of the appended claims.

The invention claimed is:

1. A drive voltage generating apparatus having a plurality of drive voltage generating sections, wherein each drive voltage generating section corresponds to one of a plurality of load devices and outputs a drive voltage to the corresponding load device, wherein each drive voltage generating section includes:
   a switching element that switches a direct current voltage to generate the drive voltage;
   sampling means that samples an analog signal representing a load state of the corresponding load device; and
   controlling means, wherein the controlling means causes the sampling means to perform sampling according to a predetermined control period, and wherein, based on a result of the sampling, the controlling means controls the switching element,
   wherein the apparatus further comprises:
   synchronizing means that synchronizes the control periods of all the drive voltage generating sections,
   wherein each controlling means commands the corresponding sampling means to sample the analog signal at timing where any of the switching elements in the drive voltage generating sections does not perform switching.

2. The drive voltage generating apparatus according to claim 1,
   wherein the synchronizing means includes a clock signal generating circuit, wherein the clock signal generating circuit generates a clock signal defining the control period, and
   wherein the clock signal generating circuit supplies the common clock signal to the controlling means of all the drive voltage generating sections.

3. The drive voltage generating apparatus according to claim 1,
   wherein the controlling means uses a triangular wave signal having the control period to control the switching elements, thereby causing the switching elements to perform switching at timing other than vertexes of the triangular wave signal, and
   wherein the controlling means causes the sampling means to perform sampling at timing of the vertexes of the triangular wave signal.

4. The drive voltage generating apparatus according to claim 2,
   wherein the controlling means uses a triangular wave signal having the control period to control the switching elements, thereby causing the switching elements to perform switching at timing other than vertexes of the triangular wave signal, and
   wherein the controlling means causes the sampling means to perform sampling at timing of vertexes of the triangular wave signal.

5. A method for controlling a drive voltage generating apparatus having a plurality of drive voltage generating sections, wherein each drive voltage generating section corresponds to one of a plurality of load devices and outputs a drive voltage to the corresponding load device, wherein each drive voltage generating section performs steps of:
   switching a direct current voltage to generate the corresponding drive voltage;
   sampling an analog signal representing a load state of the corresponding load device according to a predetermined control period; and
   switching the direct current voltage based on a result of the sampling,
   wherein the method further comprises:
   synchronizing the control periods of all the drive voltage generating sections, and
   wherein the sampling is performed at timing where no switching is performed in any of the drive voltage generating sections.

6. The controlling method according to claim 5,
   wherein the synchronizing includes supplying a common clock signal defining the control period to all the drive voltage generating sections.

7. The controlling method according to claim 5,
   wherein, in the generating of the drive voltage, a triangular wave signal having the control period is used to control the timing of the switching, and wherein the switching is performed at timing other than vertexes of the triangular wave signal, and
   wherein the sampling is performed at timing of vertexes of the triangular wave signal.

8. The controlling method according to claim 6,
   wherein, in the generating of the drive voltage, a triangular wave signal having the control period is used to control the timing of the switching, and wherein the switching is performed at timing other than vertexes of the triangular wave signal, and
   wherein the sampling is performed at timing of vertexes of the triangular wave signal.

9. A drive voltage generating apparatus having a plurality of drive voltage generating sections, wherein each drive voltage generating section corresponds to one of a plurality of load devices and outputs a drive voltage to the corresponding load device, wherein each drive voltage generating section includes:
   a switching device that performs switching to generate the drive voltage from a direct current voltage;
   a sensor for detecting a load state of the corresponding load device, wherein the sensor outputs an analog signal representing the detected load state;
   a sampling device that samples the analog signal; and
   a controller that controls the switching device and the sampling device according to a predetermined control period, wherein the controller causes the sampling device to perform sampling at timing according to the control period, wherein the controller controls the switching device based on results of the sampling, and causes the timing of the sampling to be different from timing at which the switching device performs switching;
   wherein the apparatus further comprises:
   a synchronizing device that synchronizes the control periods of all the drive voltage generating sections, wherein the synchronizing device causes the switching timing of all the switching devices to be different from the sampling timing of all the sampling devices.

10. The drive voltage generating apparatus according to claim 9,
wherein the synchronizing device includes a clock signal generating circuit, wherein the clock signal generating circuit generates a clock signal defining the control period, and
wherein the clock signal generating circuit supplies the common clock signal to the controllers of all the drive voltage generating sections.

11. The drive voltage generating apparatus according to claim 9,
wherein each controller uses a triangular wave signal having the control period to control the corresponding switching device, thereby causing the switching device to perform switching at a timing other than vertexes of the triangular wave signal, and
wherein each controller causes the corresponding sampling device to perform sampling at a timing of vertexes of the triangular wave signal.

12. The drive voltage generating apparatus according to claim 10,
wherein each controller uses a triangular wave signal having the control period to control the corresponding switching device, thereby causing the switching device to perform switching at a timing other than vertexes of the triangular wave signal, and
wherein each controller causes the corresponding sampling device to perform sampling at a timing of vertexes of the triangular wave signal.

* * * * *